United States Patent [19]

Kamiguchi et al.

[11] Patent Number: 5,216,617
[45] Date of Patent: Jun. 1, 1993

[54] GROUP MANAGEMENT SYSTEM FOR INJECTION MOLDING MACHINES

[75] Inventors: Masao Kamiguchi, Yamanashi; Kazuo Kubota, Fujiyoshida, both of Japan

[73] Assignee: Fanuc Ltd., Minamitsuru, Japan

[21] Appl. No.: 536,554

[22] PCT Filed: Nov. 22, 1989

[86] PCT No.: PCT/JP89/01192
§ 371 Date: Jul. 10, 1990
§ 102(e) Date: Jul. 10, 1990

[87] PCT Pub. No.: WO90/06221
PCT Pub. Date: Jun. 14, 1990

[30] Foreign Application Priority Data

Nov. 25, 1988 [JP] Japan .................. 63-296034

[51] Int. Cl.$^5$ .................. G06F 15/46; G05B 15/02
[52] U.S. Cl. .................. 364/476; 364/138; 364/188; 425/135
[58] Field of Search .............. 364/476, 131, 138, 188, 364/189, 138, 473, 476; 425/144, 149, 135; 264/40.1; 65/160, DIG. 13

[56] References Cited

U.S. PATENT DOCUMENTS

| | | | |
|---|---|---|---|
| 3,760,251 | 9/1973 | Posl et al. .................. | 318/601 |
| 4,369,052 | 1/1983 | Hotmer .................. | 65/160 |
| 4,547,211 | 10/1985 | Ananias .................. | 65/29 |
| 4,641,269 | 2/1987 | Japenga et al. .................. | 364/473 |
| 4,674,053 | 6/1987 | Bannai et al. .................. | 364/476 |
| 4,823,274 | 4/1989 | Kiya et al. .................. | 364/476 |
| 4,831,582 | 5/1989 | Miller et al. .................. | 364/138 |
| 5,062,053 | 10/1991 | Shirai et al. .................. | 364/476 |

FOREIGN PATENT DOCUMENTS 57-212042 12/1982 Japan .................. 364/476

Primary Examiner—Jerry Smith
Assistant Examiner—Paul Gordon
Attorney, Agent, or Firm—Staas & Halsey

[57] ABSTRACT

A group management system for injection molding machines, capable of rapidly determining molding conditions of a plurality of injection molding machines. Data is supplied through first to eleventh input devices (13a–33c), which indicates types of molding defects appearing in molded articles respectively produced under tentative molding conditions by first to eleventh injection molding machines (12a–32c) which form first to third injection molding machine groups (12, 22, 32). First to third work stations connected to the first to third injection molding machine groups (12, 22, 32) determine one or more molding conditions to be modified and the amount of each modification, with respect to the individual first to eleventh injection molding machines, by using a multi-user operating system, and program and database for molding condition determination. The results of the determination are sent to corresponding ones of the injection molding machines, and the individual injection molding machines retry injection molding under the modified molding conditions. This molding condition modifying process is repeated, and when optimum molding conditions that incur no molding defect are determined for all injection molding machines, the process is ended.

8 Claims, 1 Drawing Sheet

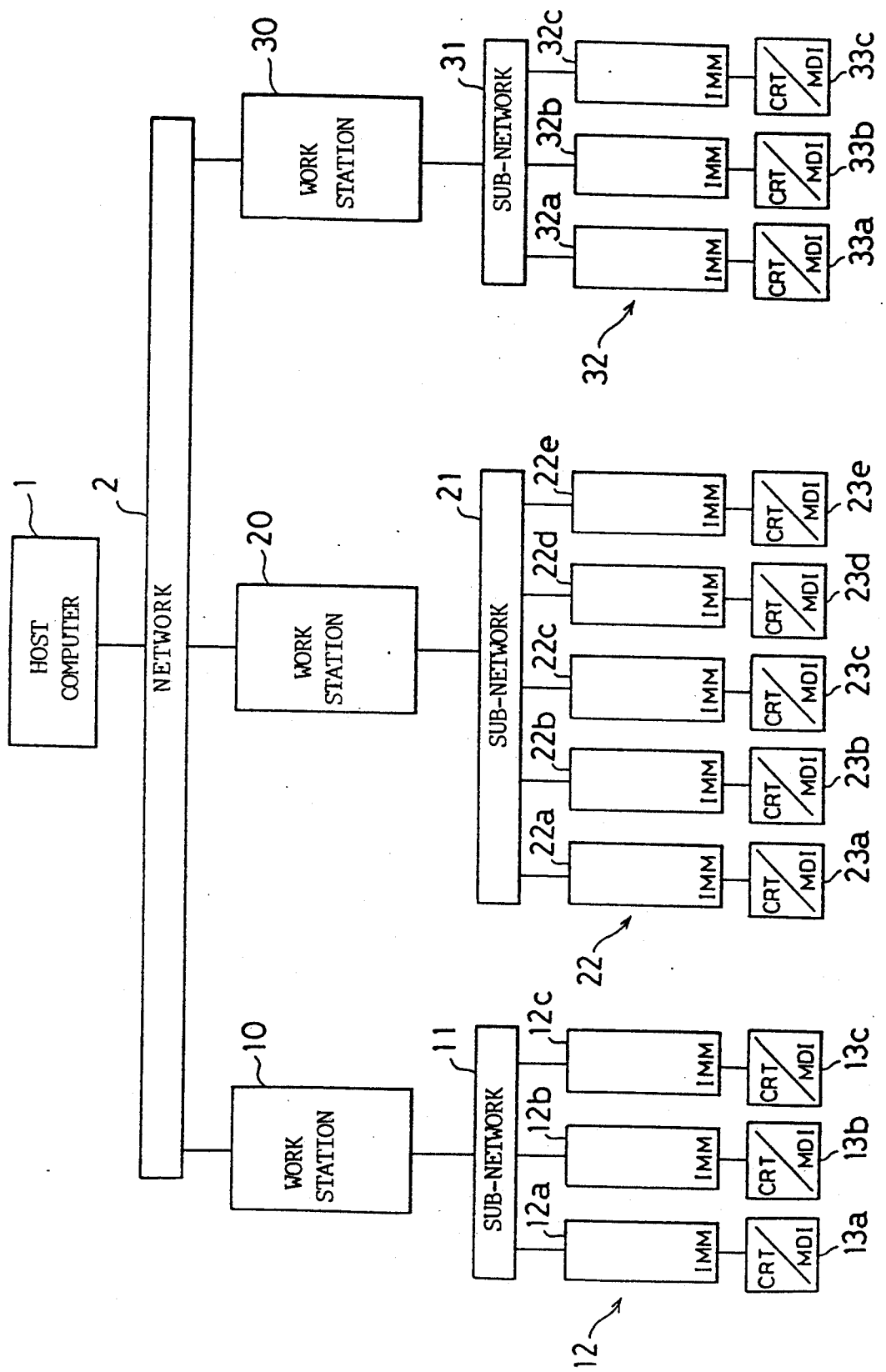

GROUP MANAGEMENT SYSTEM FOR INJECTION MOLDING MACHINES

TECHNICAL FIELD

The present invention relates to a group management system for injection molding machines, which is capable of rapidly and accurately determining optimum molding conditions for a plurality of injection molding machines, without the need of using an expensive apparatus.

BACKGROUND ART

When manufacturing molded articles by injection molding machines, a large number of molding conditions such as mold clamping force, injection speed, hold pressure, hold time, resin temperature, mold temperature, back pressure, screw rotating speed, suckback amount, cooling time, etc. must be determined. Therefore, in general, injection molding is first carried out by way of trial under the molding conditions which are tentatively determined on the basis of expert knowledge and experience in accordance with the type of article to be molded. Thereafter, one or more molding conditions are modified in accordance with the expert knowledge and experience, depending on the type of molding defect appearing in the resultant molded article, such as flash, sink mark, warp, weld mark, flaw mark, etc., and then injection molding is tried again. This molding condition determination process is repeatedly executed to find optimum molding conditions that do not cause any molding defect. Accordingly, the determination of optimum molding conditions involves considerable labor. In particular, when producing various molded articles of different types by using a plurality of injection molding machines having different structures from one another, the molding condition determining process must be performed for each of the injection molding machines, requiring much labor to determine the optimum molding conditions.

DISCLOSURE OF THE INVENTION

An object of the present invention is to provide a group management system for injection molding machines, which is capable of rapidly and accurately determining optimum molding conditions for a plurality of injection molding machines without the need of using an expensive apparatus.

To achieve the above-mentioned object, a group management system for injection molding machines of the present invention comprises a plurality of injection molding machines, a general-purpose high-performance computer connected to the injection molding machines, the computer having a multi-user operating system and adapted to use a molding condition determining program and a molding condition determining database, and input means for inputting data indicative of a type of a molding defect appearing in a molded article produced by each of the injection molding machines. The general-purpose high-performance computer is operable to automatically modify molding conditions of the individual injection molding machines in accordance with the data indicative of the type of molding defect, through the use of the molding condition determining program and database.

According to the present invention, by inputting data indicative of a type of molding defect occurring in the molded articles, produced by the plurality of injection molding machines, to the single general-purpose high-performance computer, the molding conditions of each of the injection molding machines is automatically modified online by the computer adapted to use the molding condition determining program and database. This makes it possible to rapidly and accurately determine optimum molding conditions for each injection molding machine. Further, since the multi-user operating system is installed in the single general-purpose high-performance computer, the individual processes of determining the molding conditions for the plurality of injection molding machines can be executed by the single computer in an independent and substantially simultaneous manner. Moreover, the group management system can be constructed at a relatively low cost, because individual computers are not required, each having the mold condition determining program and database, for the injection molding machines. Further, since the molding condition determining program and database are commonly used, it is easy to perform management of the program and database. Furthermore, renewal of the database in accordance with the results of the molding condition determining processes of the individual injection molding machines is permitted, whereby accumulation of know-how for the molding condition determination can be facilitated, and the sophisticated database can be constructed, and further the efficiency of the molding condition determining process can be improved.

BRIEF DESCRIPTION OF THE DRAWING

The single FIGURE is a schematic diagram of a group management system for injection molding machines according to one embodiment of the present invention.

BEST MODE OF CARRYING OUT THE INVENTION

Referring to the appended drawing, a group management system for injection molding machines according to one embodiment of the present invention comprises first, second and third general-purpose high-performance computers (hereinafter referred to as work stations) 10, 20 and 30 individually connected to a host computer 1 through a network 2 for exchange of signals therewith, and constitutes, as a whole, a local area network. In this embodiment, the first to third work stations are identical in structure, and are respectively connected, through first to third subnetworks 11, 21 and 31, to first to third groups 12, 22 and 32 of injection molding machines for exchange of signals therewith.

The first to third injection molding machine groups 12, 22 and 32 are made up of first to third injection molding machines 12a to 12c, fourth to eighth molding machines 22a to 22e, and ninth to eleventh injection molding machines 32a to 32c, respectively. The first through eleventh injection molding machines 12a–32c each have a structure known in the art and comprise a numerical control unit (not shown) with a built-in computer, etc. First through eleventh manual data input devices with CRT display (hereinafter referred to as CRT/MDI) 13a to 13c, 23a to 23e, and 33a to 33c are respectively connected to the injection molding machines. In this embodiment, at least one or more of the first through eleventh injection molding machines 12a–32c are different in structure (type) from the other machines.

The first to third work stations 10, 20 and 30 are each installed with a multi-user operating system, as well as with a program containing a molding condition determining algorithm, and a database including various data which is referred to during an execution of the program. The program and the database for the molding condition determination are created based on expert knowledge and experience, and constitute a so-called artificially intelligent expert system. In this embodiment, the first to third work stations are installed with the same multi-user operating system, the same molding condition determining program and the same database.

The operation of the group management system for injection molding machines as constructed above will be now described.

When producing molded articles, an operator inputs initial values of various molding conditions for the first to eleventh injection molding machines 12-32c, such as mold clamping force, injection speed, hold pressure, hold time, resin temperature, mold temperature, back pressure, screw rotating speed, suckback amount, cooling time, etc., which values are determined tentatively based on the expert knowledge and experience, in accordance with the types of the first to eleventh injection molding machines 12a-32c and the types of articles to be molded by the respective injection molding machines, to the injection molding machines 12a-32c through the first to eleventh CRT/MDIs 13a-33c, respectively. In this case, the types of articles to be molded by the first to eleventh injection molding machines 12a-32a may not necessarily be identical with one another. On receiving the initial molding conditions, the first to eleventh injection molding machines 12a-32c carry out tentative injection molding under the respective initial molding conditions.

The operator then examines whether or not the molded articles produced tentatively by the first to eleventh injection molding machines 12a-32c have a molding defect such as flash, sink mark, warp, weld mark, flaw mark, etc. When one or more molded articles have some molding defect, the operator inputs data indicative of the type of the molding defect, through one or more CRT/MDIs connected to the injection molding machines that produced the defective articles. Here, let it be assumed that all of the molded articles produced by the first to eleventh injection molding machines 12a-32c, respectively, had one or more molding defects, and that one or more items of data each indicative of a type of molding defect were input to each of the first to eleventh injection molding machines 12a-32c.

In this case, the first to third work stations 10, 20 and 30 read corresponding ones of the thus input data indicative of types of molding defects. The first work station 10, which received the data indicative of the types of molding defects associated with the first to third injection molding machines 12a to 12c, carries out on-line molding condition modifying processes with respect to the first to third injection molding machines 12a to 12c, for example, in a time-sharing manner, i.e., simultaneously and in parallel, using the multi-user operating system, and the program and the database for the molding condition determination. More specifically, one or more routines in the molding condition determining program corresponding to one or more items of data indicative of the type of molding defect associated with the first injection molding machine 12a, are executed with reference to the molding condition determining database, and one or more molding conditions to be modified and the amount of each modification are respectively determined. Then, data specifying the one or more molding conditions to be modified and each modification amount is transmitted to the first injection molding machine 12a. A similar process is carried out with respect to the second and third injection molding machines 12b and 12c.

The second and third work stations 20 and 30 carry out a molding condition modifying process similar to the above, with respect to the fourth to eighth injection molding machines 22a-22e and the ninth to eleventh injection molding machines 32a-32c, respectively.

After the molding condition modifying process is executed once for the individual injection molding machines in the aforesaid manner, the injection molding machines carry out injection molding again under the modified molding conditions. The operator then examines whether or not the resulting molded articles have a molding defect, and if a molding defect exists, inputs data indicative of the type of the molding defect, through the corresponding CRT/MDI. The corresponding injection molding machine then carries out an injection molding again under the molding conditions that have been modified by the work station associated therewith.

Thereafter, when a defect-free molded article is produced, the operator inputs a command to terminate the molding condition determining process, to the corresponding injection molding machine through the associated CRT/MDI, whereby optimum molding conditions which entail no molding defect are set into the injection molding machine. When optimum molding conditions are set into all of the first through eleventh injection molding machines 12a-32c in this manner, the whole of the molding condition determining process is ended.

The present invention is not limited to the above embodiment, and various modifications can be made. For example, although in the above embodiment, some of the first through eleventh injection molding machines are different in type from others, all of the injection molding machines may be of the same type, or may be all different in type. Further, when the molding condition determining process is completed, the molding condition determining databases which were respectively updated in the first to third work stations may be integrated under the control of the host computer so that the databases used in the respective work stations are matched. Moreover, the same type of molded articles may be produced by all of the injection molding machines, or different types of articles may be produced by different injection molding machines. The present invention is useful also in the case of producing molded articles of the same type by using injection molding machines having the same structure, because even in such case, the optimum molding conditions may differ from machine to machine, depending on the environmental conditions (e.g., ambient temperature). Furthermore, in the above embodiment, the molding condition determining database is installed in individual work stations, but it may be installed in the host computer.

We claim:

1. A group management system for injection molding machines, comprising:
   a plurality of injection molding machines;
   individual input means associated with each injection molding machine for each inputting data indicative of a type of a molding defect appearing in a molded article produced by one of said injection molding machines; and a general-purpose high-performance computer connected to said plurality of injection molding machines, installed with a multi-user operating system, adapted to use a molding condition determining program and a molding condition determining database, and operable to automatically modify molding conditions of the individual injection molding machines in accordance with the data indicative of the type of molding defect inputted by said individual input means, through the use of the molding condition determining program and the molding condition determining database.

2. A group management system according to claim 1, wherein at least part of said plurality of injection molding machines are different in type from others, said input means is adapted to input data indicative of types of said injection molding machines, and said general-purpose high-performance computer is operable to automatically modify the molding conditions of the individual injection molding machines in accordance with said data indicative of the types of injection molding machines.

3. A group management system according to claim 2, wherein at least part of said plurality of injection molding machines are adapted to produce molded articles which are different in type from those produced by other injection molding machines, said input means is adapted to input data indicative of types of molded articles to be produced by the respective injection molding machines, and said general-purpose high-performance computer is operable to automatically modify the molding conditions of the individual injection molding machines in accordance with said data indicative of the types of molded articles.

4. A group management system according to claim 2, wherein said molding condition determining program and said molding condition determining database are installed in said general-purpose high-performance computer.

5. A group management system according to claim 1, wherein at least part of said plurality of injection molding machines are adapted to produce molded articles which are different in type from those produced by other injection molding machines, said input means is adapted to input data indicative of types of molded articles to be produced by the respective injection molding machines, and said general-purpose high-performance computer is operable to automatically modify the molding conditions of the individual injection molding machines in accordance with said data indicative of the types of molded articles.

6. A group management system according to claim 5, wherein said molding condition determining program and said molding condition determining database are installed in said general-purpose high-performance computer.

7. A group management system according to claim 1, wherein said molding condition determining program and said molding condition determining database are installed in said general-purpose high-performance computer.

8. A group management system according to claim 1, which further includes a plurality of general-purpose high-performance computers individually connected to a host computer through a network and wherein each of said general-purpose high-performance computers is connected to a plurality of said injection molding machines.

* * * * *